United States Patent
Su (10) Patent No.: US 10,430,181 B1
(45) Date of Patent: Oct. 1, 2019

(54) RETRIEVING UPDATED FIRMWARE CODE

(71) Applicant: QUANTA COMPUTER INC., Taoyuan (TW)

(72) Inventor: Mei-Lin Su, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 16/105,043

(22) Filed: Aug. 20, 2018

(51) Int. Cl.
 G06F 9/44 (2018.01)
 G06F 8/65 (2018.01)
 G06F 3/06 (2006.01)

(52) U.S. Cl.
 CPC .............. *G06F 8/66* (2013.01); *G06F 3/0604* (2013.01); *G06F 3/065* (2013.01); *G06F 3/0632* (2013.01); *G06F 3/0673* (2013.01)

(58) Field of Classification Search
 CPC ........................................................ G06F 8/66
 USPC ........................................................ 717/173
 See application file for complete search history.

(56) References Cited

U.S. PATENT DOCUMENTS

| | | | | |
|---|---|---|---|---|
| 7,337,267 B1* | 2/2008 | Pereira | ................... | G11C 15/00 365/49.1 |
| 2003/0217357 A1* | 11/2003 | Parry | ...................... | G06F 8/65 717/168 |
| 2004/0030877 A1* | 2/2004 | Frid | ......................... | G06F 8/654 713/1 |
| 2004/0215949 A1* | 10/2004 | Dennis | .................. | G06F 9/4408 713/1 |
| 2006/0005005 A1* | 1/2006 | Lee | ............................ | G06F 8/66 713/2 |
| 2007/0016765 A1* | 1/2007 | Azzarito | ................ | G06F 9/4411 713/2 |
| 2011/0022830 A1* | 1/2011 | Piwonka | ............. | G06F 11/1417 713/2 |
| 2013/0074061 A1* | 3/2013 | Averbuch | ................ | G06F 8/665 717/171 |
| 2014/0215949 A1* | 8/2014 | Cossette | ................... | E04B 2/28 52/568 |
| 2015/0212851 A1* | 7/2015 | Busaba | ................... | G06F 9/467 711/151 |

(Continued)

OTHER PUBLICATIONS

Title: Hardening extended memory access control schemes with self verified address space, author: Jesse Elwell et al, Publused on Nov. 2017.*

(Continued)

*Primary Examiner* — Chameli Das
(74) *Attorney, Agent, or Firm* — Nixon Peabody LLP; Zhou Lu (57) ABSTRACT

Systems and methods are provided for updating expansion read-only memory (ROM) code to execute for device-specific initialization. An exemplary method comprises first accessing one or more copies of a ROM code in at least one of a plurality of repositories. The ROM code can be configured to execute an initialization process for a specific device in the computer system. The method can then select one of the one or more copies of the ROM code based on a selection criterion to yield a selected ROM code. The method can then copy the selected ROM code to a system memory of the computer system. The method can then execute the selected ROM code in the system memory to initialize the specific device.

18 Claims, 6 Drawing Sheets

(56) References Cited

U.S. PATENT DOCUMENTS

| | | | | |
|---|---|---|---|---|
| 2015/0378639 A1* | 12/2015 | Chien | ............. | G06F 3/0647 |
| | | | | 711/104 |
| 2017/0286093 A1* | 10/2017 | Steshenko | ............. | G06F 8/71 |
| 2017/0371795 A1* | 12/2017 | Wang | ............. | G06F 12/123 |
| 2018/0113815 A1* | 4/2018 | Eckert | ............. | G06F 12/126 |

OTHER PUBLICATIONS

Title: Using Stacked Bitlines and Hybrid ROM cells to form ROM and SRAM-ROM with increased storage density, author: Brandon et al, source: IEEE, published on 2006.*

* cited by examiner

RETRIEVING UPDATED FIRMWARE CODE

FIELD

The present invention relates to retrieving read-only memory (ROM) code, and more specifically, to systems and methods for selecting a preferred ROM code among possible ROM codes on local and remote repositories accessible by a computer system.

BACKGROUND

Computer systems use expansion read-only memory (ROM) code to initialize specific devices in the computer systems. Often, the expansion ROM code is used while the computer system is booting up. For example, the expansion ROM code of a video graphics array (VGA) device enables video output functionality for the computer system. In another example, the expansion ROM code of a storage device can initialize a hard drive disk and expose it to BIOS while the computer system is booting up.

Running the expansion ROM code can initialize important firmware devices in a computer system, such as graphics card and hard disk drives. These firmware devices are not easily initialized without the expansion ROM code running properly during the system boot up. Therefore, a computer system can have reduced functionality when no expansion ROM code exists to initialize a specific device. The computer system can also fail to properly initialize a specific device when the expansion ROM code is invalid or not up to date.

Expansion ROM code is often stored on a computer bus card. The computer bus card, also known as an expansion card or adapter card, provides the main power-up instructions of initializing this card for the computer system. When expansion ROM code is stored on the computer bus card, the computer system can easily access the code and run the code during power up. However, there are several problems with this approach. In particular, if users need to replace the computer bus card for any reason, it is not easy to tell whether a new computer bus card will have the appropriate expansion ROM code on the replacement card. Without the appropriate expansion ROM code on the card, it is typically an onerous process for the user to initialize the specific devices. The user must complete a manual initialization process by retrieving appropriate expansion ROM code and manually putting it onto the computer bus card.

In some instances, expansion ROM code is stored in a location accessible by the computer system, but not on the computer bus card. However, many conventional computer systems do not support accessing expansion ROM codes stored in other locations. Such computer systems are also generally incapable of determining which expansion ROM code is the preferred code for execution in circumstances where multiple copies of expansion ROM code exist in a computer system.

Additionally, it is difficult for users to update the expansion ROM code if it is out of date. For example, users typically need to either update the expansion ROM code manually, or replace the computer bus card itself with a bus card that has updated expansion ROM code. In order to manually update the expansion ROM code, users need to retrieve the ROM image from FAE (Field Application Engineer) of the computer bus card vendor or download it from the vendor's website. The user then needs to copy the ROM image into a storage device (e.g. USB flash key). The user then needs to power on the system with the original computer bus card and boot to operating system. Then the user needs to use a vendor-specific utility to flash or update the ROM image of expansion card.

Therefore, what is needed is a system or method which can access expansion ROM code in any of a plurality of repositories accessible by the computer system when the expansion ROM code is missing or out-of-date from the computer bus card.

SUMMARY

The various examples of the present disclosure are directed towards selecting a preferred ROM code among possible ROM codes on local and remote repositories accessible by a computer system. An exemplary method, according to an embodiment of the present disclosure, runs through a series of steps to check possible ROM codes and execute a selected ROM code. One embodiment, according to the present disclosure, can comprise a computer-implemented method for updating read-only memory code in a computer system. The method can access one or more copies of a ROM code in at least one of a plurality of repositories. The ROM code can be configured to execute an initialization process for a specific device in the computer system. After accessing one or more copies of a ROM code, the method can select one of the one or more copies of the ROM code based on a selection criterion. This can yield a selected ROM code. The method can then copy the selected ROM code into system memory of the computer system to initialize the specific device.

In some examples, the plurality of repositories can include local repositories in the computer system and remote repositories outside of the computer system.

In some examples, the selection criterion can comprise determining whether a most recent copy of the ROM code can be identified from the one or more copies of the ROM code. In response to determining that a most recent copy of the ROM code can be identified, the method can select the most recent copy as the selected ROM code. In response to determining that a most recent copy of the ROM code cannot be identified, the method can select a copy of the ROM code with a highest priority as the selected ROM code.

In some examples, a priority of a copy of the ROM code is determined by a location of the copy of the ROM code. A local repository can have a higher priority than a remote repository. A computer bus card of the computer system can have a higher priority than any other local repository in the computer system.

In some examples, copying the selected ROM code can further comprise determining whether the selected ROM code is located on a remote repository. In response to determining that the selected ROM code is located on a remote repository, the method can download the selected ROM code from the remote repository to yield a downloaded selected ROM code. The method can then receive input from a user to store the downloaded selected ROM code in a local repository in the computer system.

In other examples, the method can first comprise determining that existing ROM code in a computer bus card in the computer system is not present and/or not valid.

In other examples, the method can first comprise determining that an existing ROM code in a computer bus card in the computer system is present and valid. The method can also determine that the computer system prefers to select the ROM code based on the selection criterion instead of automatically using the existing ROM code.

The words "computer system," "computing system," and "server system" are all used interchangeably in this present disclosure, and can be used to identify any electronic computing system that carries out sequences of arithmetic or logical operations via computer programming. Such an electronic computing system can include, but not be limited to, a personal computer, a laptop computer, a tablet, and a commercial or private server system.

BRIEF DESCRIPTION OF THE DRAWINGS

The disclosure, and its advantages and drawings, will be better understood from the following description of exemplary embodiments together with reference to the accompanying drawings. These drawings depict only exemplary embodiments, and are therefore not to be considered as limitations on the scope of the various embodiments or claims.

DETAILED DESCRIPTION

The present invention is described with reference to the attached figures, where like reference numerals are used throughout the figures to designate similar or equivalent elements. The figures are not drawn to scale and are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The present disclosure is directed to a methodology that retrieves updated expansion ROM code and executes the code to initialize a specific device. In an exemplary embodiment of the method, a computer system can first access one or more copies of an expansion ROM code in a plurality of repositories. The computer system can then select one copy of the code based on a selection criterion. Finally, the computer system can then copy the selected ROM code to a system memory of the computer system and execute the selected ROM code in the system memory.

In the methodology disclosed herein, the selection criterion can provide for first selecting a most recent version of the expansion ROM code. If there is no most recent version, the selection criterion can provide for selecting an expansion ROM code according to which copy of the code has the highest priority. For example, a higher priority can be assigned to expansion ROM code from a local repository, and a lower priority can be assigned to expansion ROM code from a remote repository.

This method allows for the updating of the expansion ROM code instead of always relying on the expansion ROM code in the initial computer bus card. In the method, the computer system can look to local and remote repositories to find other copies of the expansion ROM code in order to initialize the specific device.

This method has advantages over conventional processes, such as allowing for the evaluation of available expansion ROM code to select a preferred ROM code. For example, because a more recent code typically has the latest updates, the more recent code can be a preferred selection. Thus, the methodology can provide for selecting a most recent expansion ROM code so as to select and use a preferred ROM code. In another example, since a locally stored ROM code is typically best configured for the device to be initialized, the methodology can provide for preferring a copy of the expansion ROM code on a local repository over a copy of the expansion ROM code on a remote repository.

Figure 1:
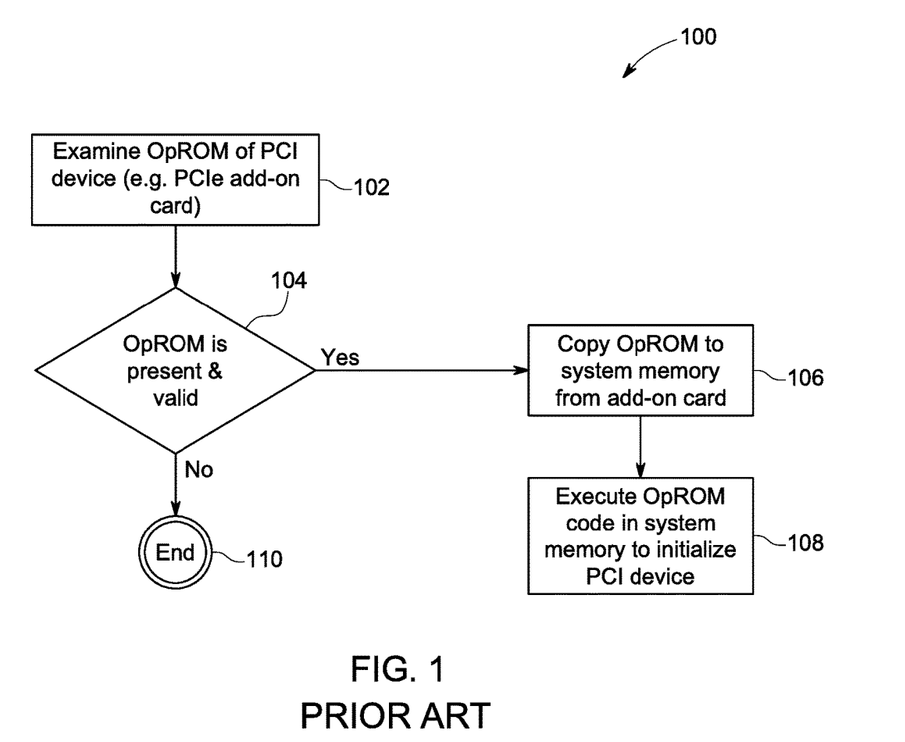
FIG. 1 shows a flowchart of a methodology for executing expansion ROM code according to the prior art.

FIG. 1 shows a flowchart of a methodology 100 for executing expansion ROM code in a computer system according to the prior art. In this methodology 100, the first step (step 102) is to examine whether the system can locate expansion ROM code on the peripheral component interconnect (PCI) device. For example, the PCI device can be a computer bus card. If the ROM code is found to be present and valid (at step 104), then the computer system can proceed to copy the expansion ROM code to the system memory from the PCI device (step 106). The methodology 100 can then execute the expansion ROM code in the system memory and initialize the PCI device (step 108). However, if the system cannot locate expansion ROM code on the PCI device (at step 104), then the methodology 100 ends (step 110).

As can be seen from FIG. 1, conventional methodologies generally do not provide any means for initializing the PCI device if no expansion ROM code can be found on the PCI device. Consequently, the methodology 100 has limited circumstances in which it can be useful and has no back-up if requirements of the methodology 100 are not met.

Figure 2:
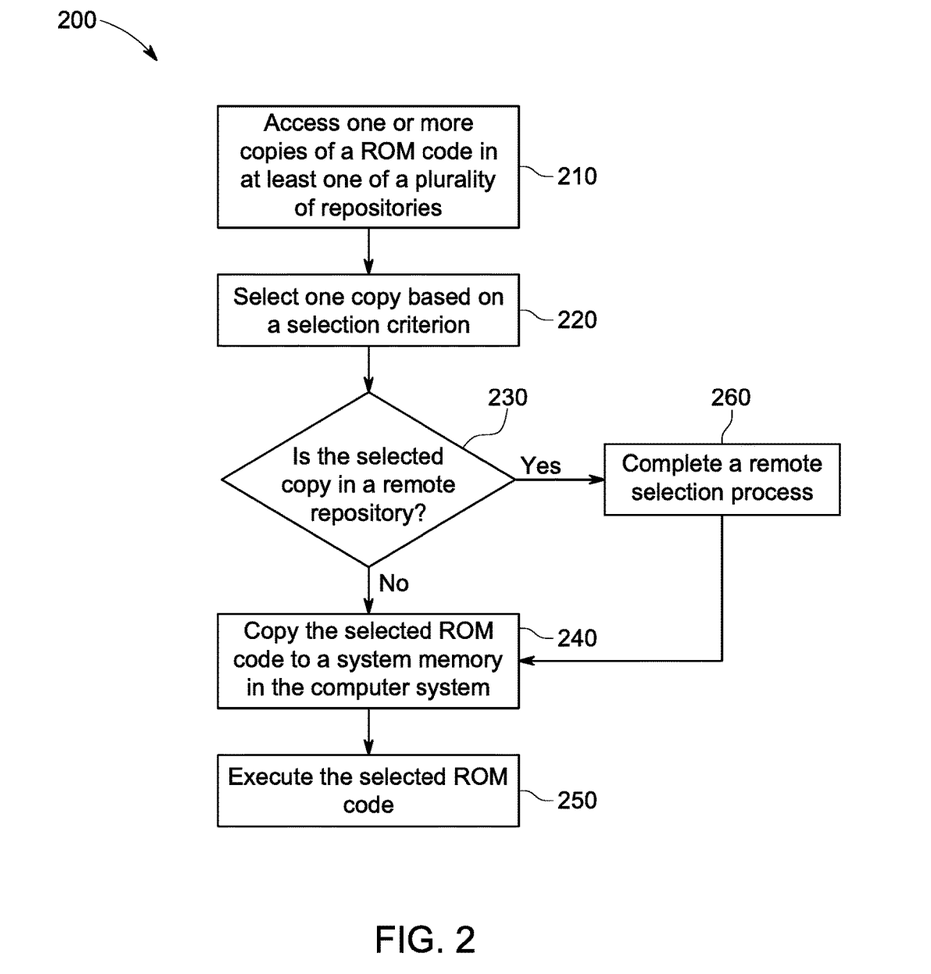
FIG. 2 shows a flowchart of an exemplary methodology for updating read-only memory code in a computer system, according to an embodiment of the present disclosure.

FIG. 2 shows a flowchart of an exemplary methodology 200 for updating read-only memory code in a computer system, according to an embodiment of the present disclosure. The methodology 200 can be performed during the boot-up phase of a computer system such that the processes are complete before the user interacts with the computer system. The methodology 200 can be integrated into the BIOS software of a computer system and performed during the boot-up process.

During the boot-up process of a computer system but before the initiation of the methodology 200, the computer system can first check whether existing ROM code on a computer bus card in the computer system is present and valid. If the existing ROM code is found to be not present and/or not valid, the computer system can then initialize the methodology 200 of FIG. 2. Checking first whether the existing ROM code is present and valid allows the computer system to run as efficiently as possible. For example, if the existing ROM code is already present and valid, there is no need to search the computer system for an updated ROM code. Searching for an updated ROM code can take unnecessary additional time.

Alternatively, the computer system can determine that existing ROM code in a computer bus card in the computer system is present and valid. The computer system can then check system preferences to identify that the computer system still prefers to select a ROM code based on the selection criterion through the methodology 200, instead of automatically using the existing ROM code. This allows a user to set system preferences and make the individual determination as to whether the computer system should sacrifice efficiency in order to have the most up-to-date ROM code.

Regardless of whether the computer system performs the initial checks on the existing ROM code, the methodology 200 begins at step 210 by accessing one or more copies of a ROM code in at least one of a plurality of repositories. The ROM code can be an expansion ROM code, an option ROM code, or any other code configured to execute an initialization process for a specific device in the computer system. For example, the ROM code can be configured to execute an initialization process for a VGA card, a hard drive disk, or any other device in a computer system which can use independent initialization code. Step 210 can access copies of the ROM code in any of a plurality of repositories.

The repositories can include repositories local to the computer system and repositories remote to the computer system. Examples of local repositories can include any repositories within the computer system, such as a computer bus card, an electrically erasable programmable read-only memory (EEPROM) on a peripheral component interconnect express (PCIe) card, EEPROM on a motherboard unit of the computer system; and/or a reserved space of a basic input/output system (BIOS). Local repositories include any memory which is directly accessible by the BIOS such that the BIOS does not need to access the memory via an internet connection or a 3-parity component. A hard drive or USB drive can be a local repository if it is directly connected to a motherboard unit of the computer system.

Examples of remote repositories can include any repositories not directly connected to a motherboard unit of the system but accessible via a linked connection such as Wi-Fi or Ethernet or other connection which takes a requisite amount of latency to retrieve data. Remote repositories can also be accessible via a 3-parity connection. Therefore, remote repositories can also include computer components within the computer system but that are not directly accessible by the BIOS. Some examples of remote repositories can include hard drive disks, universal serial bus (USB) drives, and/or remote firmware control servers.

After completing step 210, the methodology 200 proceeds at step 220 by selecting one copy of the ROM code based on a selection criterion. An exemplary selection criterion is discussed further with respect to FIG. 3. Referring back to FIG. 2, the selection criterion in step 220 serves to select a single copy of the ROM code in the case where step 210 accessed more than one copy of ROM code. Furthermore, the selection criterion serves to ensure that the most reliable, up-to-date, and easily accessible copy of ROM code is selected.

The methodology 200 can then check whether the selected copy is in a remote repository in step 230. If the selected copy is in a remote repository, the method will continue to step 260 and complete a remote selection process. An exemplary remote selection process is discussed below in more detail with regards to FIG. 4. Referring back to FIG. 2, the method will proceed to step 240 after the remote selection process of step 260 has completed.

If the computer system determines in step 230 that the selected copy is not in a remote repository, the methodology 200 can proceed to step 240. In step 240, the methodology 200 copies the selected ROM code to system memory in the computer system. The system memory can be the computer component which holds computer instructions for execution during a boot up process for the computer system. For example, the system memory can be dynamic random access memory (DRAM).

The methodology 200 then completes in step 250 by executing the selected ROM code, which runs an initialization process for a specific device in the computer system.

Therefore, the exemplary methodology 200 has a number of advantages over contemporary processes. Computer systems can initialize specific devices in a wider range of circumstances than conventional systems because the methodology 200 accesses ROM code in a variety of repositories, both local to the computer system and remote to the computer system. Conventional systems only search for ROM code on the computer bus card, and cannot initialize a device if ROM code was not found on the computer bus card. Additionally, the exemplary methodology 200 ensures that the most updated, easily accessible, and reliable code is selected by the selection criterion in step 220. This step ensures that the best available ROM code is always used for device initialization.

Therefore, the method of FIG. 2 presents advantages over contemporary processes which require participation from a user to download, identify, and select update code for an initialization process. Additionally, contemporary processes typically need to run update procedures for specific devices while the computer is powered on and accessible by the user. The user then needs to restart the computer system before running the executed code. In contrast, the methodology 200 allows the update procedure to run during a boot up process for the computer system.

Figure 3:
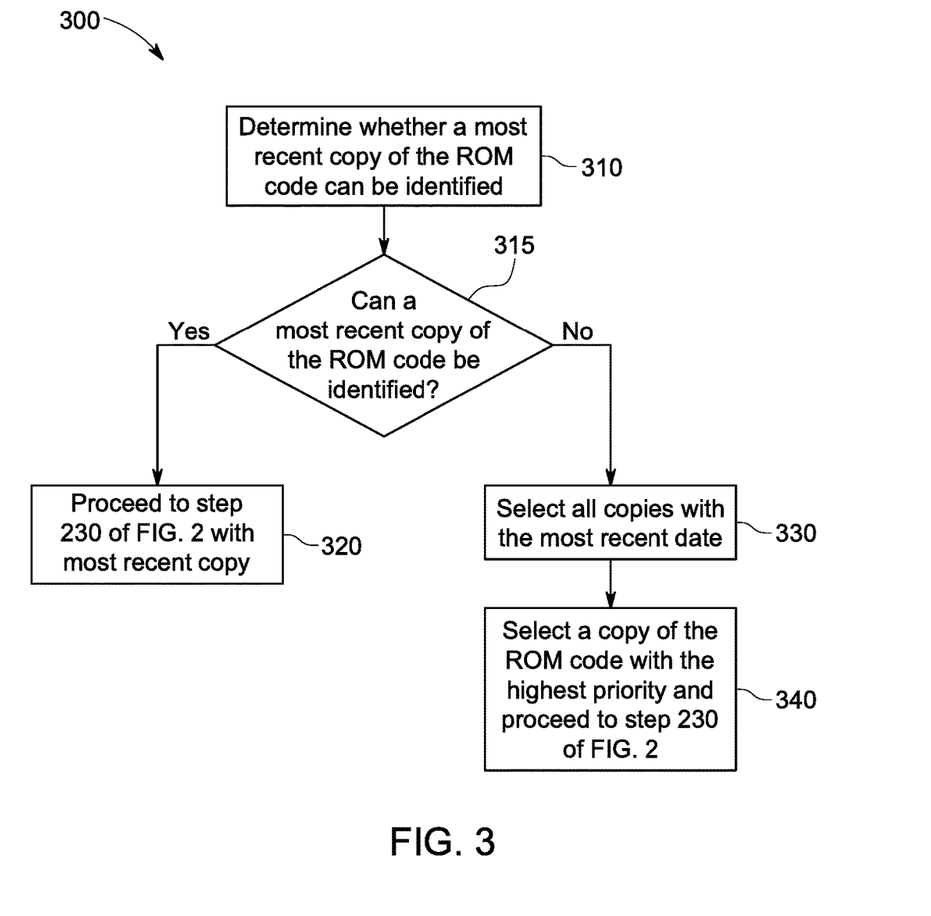
FIG. 3 shows an exemplary selection criterion, according to an embodiment of the present disclosure.

As discussed above, step 220 in FIG. 2 involves selecting one of the accessed copies of the ROM code based on a selection criterion. FIG. 3 shows a method 300 implementing an exemplary selection criterion, according to an embodiment of the present disclosure. In step 310, the method 300 first evaluates the accessed ROM codes (e.g., ROM codes accessed at step 210 of FIG. 2) to determine which copy of the ROM code is most recent. The most recent copy can be ROM code that was most recently written or published—i.e., with a most recent date. The date can be identified by a tag on the code or any other mechanism of identifying a recentness of a code copy. For example, FIG. 5 discusses an exemplary structure of the ROM code according to an embodiment of the present disclosure. Referring back to FIG. 3, identifying a most recent copy ensures that the code used to initialize the specific device will be the most updated code.

In some instances, the method 300 can identify a single, most recent copy of the ROM code at step 310. For example, a summary table can be created to list the expansion ROM code and its revision data. Such a summary table can include data such as a vendor identification for the expansion ROM code, a corresponding device identification for what computer device uses the expansion ROM code, any revision data of the expansion ROM code, a revision history of the expansion ROM code, and a location for each copy of revised expansion ROM code. Therefore, the BIOS can retrieve the summary table to determine which repository has most recent copy of the ROM code.

If a most recent copy can be identified (at step 315), the method 300 can proceed to step 320. At step 320, the method 300 returns to step 230 of FIG. 2, with the most recent copy of the ROM code as the selected code.

In contrast, if a most recent copy cannot be identified (at step 315), the method 300 can proceed instead to step 330 for further processing. That is, in some cases, there can be several copies of the ROM code with a most recent date. The method 300 can proceed to step 330 for additional processing to identify all copies of the ROM code with the most recent date. Therefore, if there are some copies of the ROM code with a more recent date and others with a less recent date, the method 300 can proceed with only the copies of the ROM code with the more recent date.

Once the ROM codes with the most recent date are identified at step 330, the method 300 can then proceed to step 340. At step 340, a copy of the ROM code with the highest priority can be selected. Further, at step 320, the method 300 returns to step 230 of FIG. 2, with the highest priority ROM code as the selected code.

A priority of a ROM code can be specified in a variety of ways. However, in one exemplary configuration, the method 300 can determine priority as follows. First, a location for each copy of the ROM code can be identified. For example, as discussed above, each copy of the ROM code can be found in a local repository or a remote repository and the corresponding repository can be noted. Thereafter, a location priority can be used. For example, local repositories can have a higher priority than remote repositories. In such a configuration, the method 300 will result in a preference for a copy of the ROM code from a local repository over a copy from a remote repository. Further, even among similar types of repositories (local or remote), a priority can be specified. For example, copies of the ROM code in the computer bus card can have the highest priority over copies of the ROM code in other local repositories of the computer system.

In other exemplary embodiments of the present disclosure, the selection criterion can prefer ROM code from based on a revision author of the ROM code. For example, a revision author who is the same as a creator of the firmware can be preferred. In another exemplary embodiment of the present disclosure, an interface can be provided for the user in real time and the user can select which ROM code is preferred.

The method 300 provides many advantages over contemporary processes. For example, contemporary processes typically only evaluate ROM code found on the computer bus card and do not have a method to evaluate recentness of the code. In contrast, the method 300 can result in preferring ROM code based on selecting a copy of the ROM code with the most recent date.

Furthermore, the method 300 can evaluate which copy of the ROM code to execute based on a location of the code. This can result in a more efficient boot-up process. For example, selecting code from the computer bus card does not require the computer system to download the code from a remote repository, save it to a new location, and then execute the code. Therefore, if the ROM code on the computer bus card is up-to-date, the methods of the present disclosure avoid the need for unnecessary processes.

Figure 4:
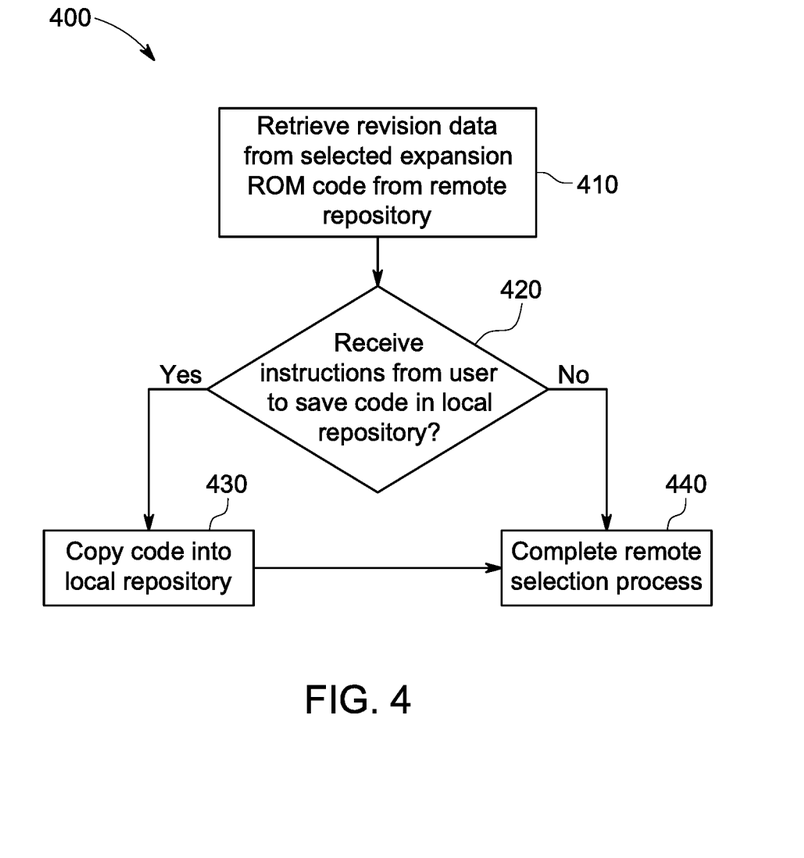
FIG. 4 shows an exemplary methodology for saving selected expansion ROM code from a remote repository into a local repository, according to an embodiment of the present disclosure.

In some configurations, if the ROM code is ultimately obtained from a remote repository, it can be advantageous to store that ROM code in a local repository for future use. This is illustrated in FIG. 4. FIG. 4 shows an exemplary remote selection process 400 for saving selected expansion ROM code from a remote repository into a local repository, according to an embodiment of the present disclosure. The remote selection process 400 is an optional process that can begin in the event that the selected ROM code of the methodology 200 is located in a remote repository.

The remote selection process 400 starts in step 410 where revision data from the selected ROM code is received from the remote repository. For example, the entire selected expansion ROM code can be downloaded from the remote repository. In another example embodiment, just the revision data from the selected expansion ROM code can be received from the remote repository. The revision data can be retrieved and placed into a local drive, an EEPROM on the motherboard, a reserved space on the BIOS flash ROM, or any location on a local repository. In some examples, the location can be selected by a user.

The remote selection process 400 can then proceed in step 420 to receive instructions from the user as to whether the remote selection process 400 should save the ROM code in a local repository. Saving the ROM code in a local repository allows the ROM code to be more efficiently accessed in future attempts and more efficiently executed. After receiving instructions to save the ROM code in a local repository, the remote selection process 400 can proceed to step 430 where the ROM code is copied into a local repository.

The remote selection process 400 completes at step 440 after either (1) not receiving instructions to save the code in a local repository (at step 420); or (2) completing a process of copying the code into a local repository (at step 430).

The remote selection process 400 presents advantages over contemporary processes because the remote selection process allows updated ROM code to be copied into a local repository and used repeatedly in all future boot up processes of the computer system. This increases the efficiency of all future boot up processes because the system does not have to download code from a remote repository before continuing with the boot up process.

Figure 5:
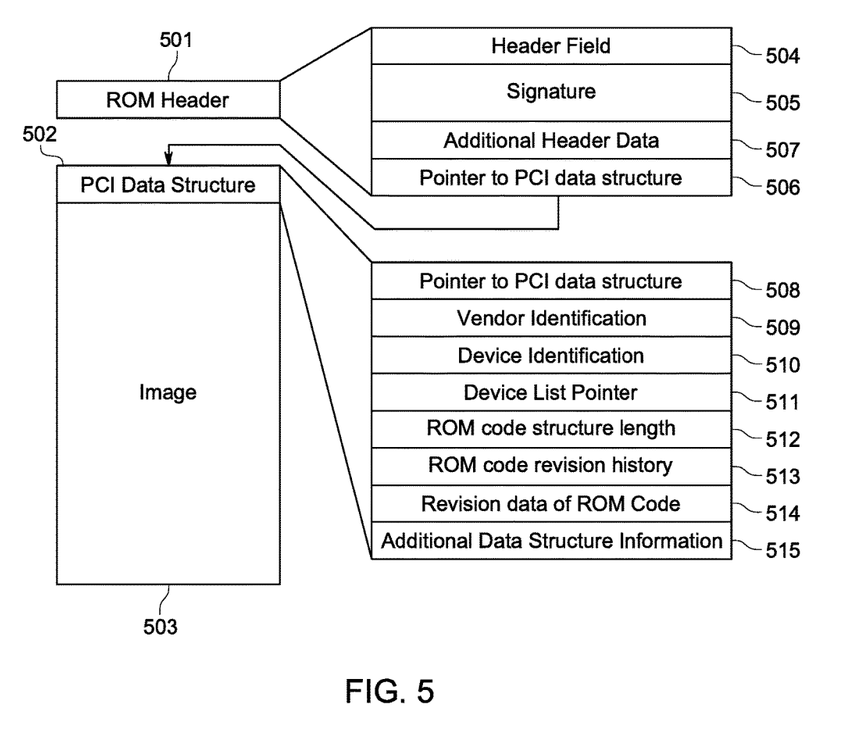
FIG. 5 shows an exemplary memory map of the structure of expansion ROM code according to an embodiment of the present disclosure.

FIG. 5 shows an exemplary structure of expansion ROM code according to an embodiment of the present disclosure. For example, an exemplary structure can include a ROM header 501, a PCI data structure 502, and an image 503. The ROM header 501 can include a header field for the expansion ROM code 504, a signature of the expansion ROM code 505, a pointer to PCI data structure 506, and any other additional header data 507. This information can be stored, analyzed, and recalled by the BIOS when evaluating the expansion ROM code.

The PCI data structure 502 can include information such as a pointer to the PCI data structure 508, a vendor identification 509, a device identification 510, a device list pointer 511, a ROM code structure length 512, a ROM code revision history 513, revision data of the ROM code 514, and any additional data structure information 515. The device identification 510 can identify a specific device holding a particular ROM code. The device list pointer 511 can point to a device list which includes all other devices that can be supported by the specific ROM code. The vendor identification 509, device identification 510, device list pointer 511 and ROM code revision history 513 can be used as described with respect to FIG. 3. The revision data of the ROM code is accessible by the BIOS when enacting any of the methods of the present disclosure.

Figure 6:
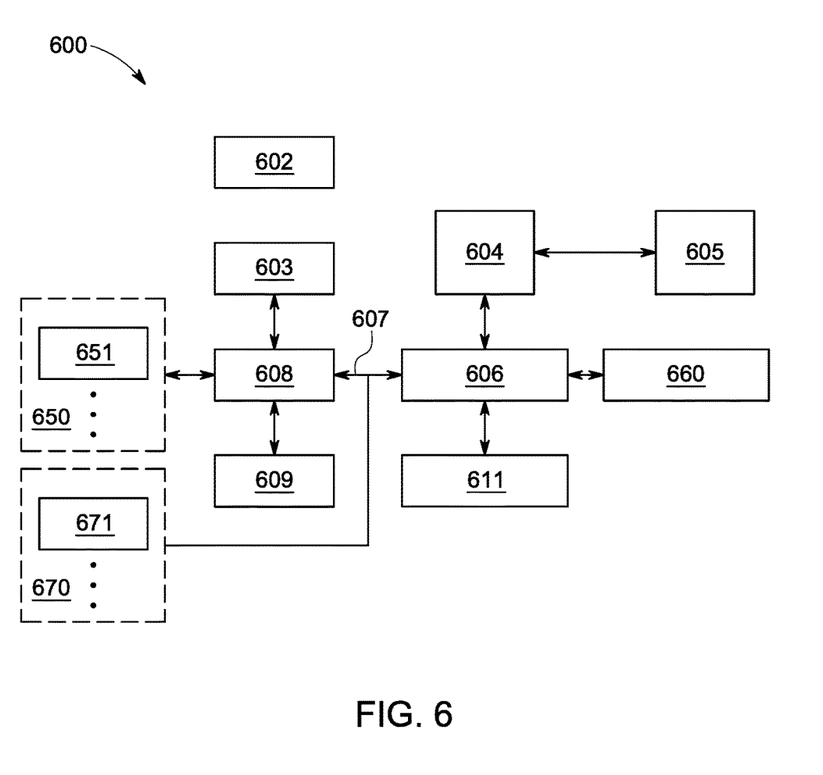
FIG. 6 is a schematic block diagram illustrating an exemplary system, in accordance with an implementation of the present disclosure.

FIG. 6 is a schematic block diagram illustrating an exemplary server system 600, in accordance with an implementation of the present disclosure. In this example, the server system 600 includes at least one microprocessor or processor 604; a BMC 603; one or more cooling modules 660; a main memory (MEM) 611; at least one power supply unit (PSU) 602 that receives an AC power from an AC power supply, and provides power to various components of the server system 600, such as the processor 604, north bridge (NB) logic 606, PCIe slots 670, south bridge (SB) logic 608, storage device 609, ISA slots 650, PCI slots 670, and BMC 603.

After being powered on, the server system 600 is configured to load software application from memory, a computer storage device, or an external storage device to perform various operations. The storage device 609 is structured into logical blocks that are available to an operating system and applications of the server system 600. The storage device 609 is configured to retain server data even when the server system 600 is powered off.

In FIG. 6, the main memory 611 is coupled to the processor 604 directly. The main memory 611 may include, but is not limited to, DRAM, double data rate DRAM (DDR DRAM), static RAM (SRAM), or other types of suitable memory. The main memory 611 can be configured to store firmware data of the server system 600. In some configurations, firmware data can be stored on the storage device 609.

In some implementations, the server system 600 can further comprise a flash storage device. The flash storage device can be a flash drive, a random access memory (RAM), a non-volatile random-access memory (NVRAM), or an electrically erasable programmable read-only memory (EEPROM). The flash storage device can be configured to store system configurations such as firmware data.

The processor 604 can be a central processing unit (CPU) configured to execute program instructions for specific functions. For example, during a booting process, the processor 604 can access firmware data stored in the BMC 603 or the flash storage device, and execute the BIOS 605 to initialize the server system 600. After the booting process, the processor 604 can execute an operating system in order to perform and manage specific tasks for the server system 600. In another embodiment, the BIOS 605 connects to the PCH instead of the processor 604.

In some configurations, the processor 604 can be multicore processors, each of which is coupled together through a CPU bus connected to the NB logic 606. In some configurations, the NB logic 606 can be integrated into the processor 604. The NB logic 606 can also be connected to a plurality of peripheral component interconnect express (PCIe) slots 670 and an SB logic 608 (optional). The plurality of PCIe slots 670 can be used for connections and buses such as PCI Express x1, USB 2.0, SMBus, SIM card, future extension for another PCIe lane, 1.5 V and 3.3 V power, and wires to diagnostics LEDs on the server system 600's chassis.

In the server system 600, the NB logic 606 and the SB logic 608 are connected by a peripheral component interconnect (PCI) Bus 607. The PCI Bus 607 can support functions on the processor 604 but in a standardized format that is independent of any of the processor 604's native buses. The PCI Bus 607 can be further connected to a plurality of PCI slots 670 (e.g., a PCI slot 671). Devices connect to the PCI Bus 607 may appear to a bus controller (not shown) to be connected directly to a CPU bus, assigned addresses in the processor 604's address space, and synchronized to a single bus clock. PCI cards that can be used in the plurality of PCI slots 670 include, but are not limited to, network interface cards (NICs), sound cards, modems, TV tuner cards, disk controllers, video cards, small computer system interface (SCSI) adapters, and personal computer memory card international association (PCMCIA) cards.

The SB logic 608 can couple the PCI Bus 607 to a plurality of expansion cards or ISA slots 650 (e.g., an ISA slot 651) via an expansion bus. The expansion bus can be a bus used for communications between the SB logic 608 and peripheral devices, and may include, but is not limited to, an industry standard architecture (ISA) bus, PC/604 bus, low pin count bus, extended ISA (EISA) bus, universal serial bus (USB), integrated drive electronics (IDE) bus, or any other suitable bus that can be used for data communications for peripheral devices.

In this example, the BIOS 605 can be any program instructions or firmware configured to initiate and identify various components of the server system 600. The BIOS is an important system component that is responsible for initializing and testing hardware components of a corresponding server system. The BIOS can provide an abstraction layer for the hardware components, thereby providing a consistent way for applications and operating systems to interact with a peripheral device such as a keyboard, a display, and other input/output devices.

In the server system 600, the SB logic 608 is further coupled to the BMC 603 that is connected to the PSU 602. In some implementations, the BMC 603 can also be a rack management controller (RMC). The BMC 603 is configured to monitor operation status of components of the server system 600, and control the server system 600 based upon the operation status of the components.

Although only certain components are shown within the exemplary server system 600 in FIG. 6, various types of electronic or computing components that are capable of processing or storing data, or receiving or transmitting signals, can also be included in the exemplary server system 600. Further, the electronic or computing components in the exemplary server system 600 can be configured to execute various types of application, and/or can use various types of operating systems. These operating systems can include, but are not limited to, Android, Berkeley Software Distribution (BSD), iPhone OS (iOS), Linux, OS X, Unix-like Real-time Operating System (e.g., QNX), Microsoft Windows, Window Phone, and IBM z/OS.

Depending on the desired implementation for the exemplary server system 600, a variety of networking and messaging protocols can be used, including but not limited to TCP/IP, open systems interconnection (OSI), file transfer protocol (FTP), universal plug and play (UpnP), network file system (NFS), common internet file system (CIFS), AppleTalk etc. As would be appreciated by those skilled in the art, FIG. 6 is used for purposes of explanation. Therefore, a network system can be implemented with many variations, as appropriate, yet still provide a configuration of network platform in accordance with various examples of the present disclosure.

In exemplary configurations of FIG. 6, the exemplary server system 600 can also include one or more wireless components operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections, as known in the art. Various other elements and/or combinations are possible as well within the scope of various examples.

While various examples of the present invention have been described above, it should be understood that they have been presented by way of example only, and not limitation. Numerous changes to the disclosed examples can be made in accordance with the disclosure herein without departing from the spirit or scope of the invention. Thus, the breadth and scope of the present invention should not be limited by any of the above described examples. Rather, the scope of the invention should be defined in accordance with the following claims and their equivalents.

Although the invention has been illustrated and described with respect to one or more implementations, equivalent alterations, and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular examples only and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. Furthermore, terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A computer-implemented method for updating read-only memory (ROM) code in a computer system, comprising:
   accessing one or more copies of a ROM code in at least one of a plurality of repositories, wherein the ROM code is configured to execute an initialization process for a specific device in the computer system;
   selecting a copy of the ROM code based on a selection criterion to yield a selected ROM code, wherein the selection criterion is associated with a location of the one or more copies of the ROM code, the location being either a local repository or a remote repository;
   copying the selected ROM code to system memory of the computer system; and
   executing the selected ROM code in the system memory to initialize the specific device, wherein the copy of the ROM code is a copy of updated expansion ROM code, wherein the selection criterion further comprises:
      determining whether a most recent copy of the ROM code is identified from the one or more copies of the ROM code;
      in response to determining that a most recent copy of the ROM code is identified, selecting the most recent copy as the selected ROM code; and
      in response to determining that a most recent copy of the ROM code is not identified, selecting a copy of the ROM code as the selected ROM code, based at least in part on a priority of the copy of the ROM code, wherein the priority is associated with the location of the copy of the ROM code.

2. The computer-implemented method of claim 1, wherein the plurality of repositories includes local repositories in the computer system and remote repositories outside of the computer system.

3. The computer-implemented method of claim 1, wherein a priority of a copy of the ROM code is determined by a location of the copy of the ROM code, and wherein a local repository has a higher priority than a remote repository, and wherein a computer bus card of the computer system has a higher priority than any other local repository in the computer system.

4. The computer-implemented method of claim 1, wherein copying the selected ROM code further comprises:
   determining whether the selected ROM code is located on a remote repository; and
   in response to determining that the selected ROM code is located on a remote repository, downloading the selected ROM code from the remote repository to yield a downloaded selected ROM code.

5. The computer-implemented method of claim 4, wherein copying the selected ROM code further comprises receiving input from a user to store the downloaded selected ROM code in a local repository in the computer system.

6. The computer-implemented method of claim 1, wherein the method further comprises:
   prior to the accessing, determining that existing ROM code in a computer bus card in the computer system is not present or invalid; and
   performing the accessing and the selecting in response to determining that existing ROM code in a computer bus card in the computer system is not present or invalid.

7. A computer system configured for updating read-only memory (ROM) code, comprising:
   a plurality of repositories;
   a system memory;
   a specific device;
   a processor; and
   a computer-readable medium storing instructions that, when executed by the processor, cause the system to perform operations comprising:
      accessing one or more copies of a ROM code in at least one of the plurality of repositories, wherein the ROM code is configured to execute an initialization process for the specific device;
      selecting one of the one or more copies of the ROM code based on a selection criterion to yield a selected ROM code;
      copying the selected ROM code to the system memory of the computer system, wherein the one of the one or more copies of the ROM code is a copy of updated expansion ROM code; and
   executing the selected ROM code in the system memory to initialize the specific device,
   wherein the selection criterion further comprises:
      determining whether a most recent copy of the ROM code is identified from the one or more copies of the ROM code;
      in response to determining that a most recent copy of the ROM code is identified, selecting the most recent copy as the selected ROM code; and
      in response to determining that a most recent copy of the ROM code is not identified, selecting a copy of the ROM code with a highest priority as the selected ROM code, wherein the priority is associated with a location of the copy of the ROM code, the location being either a local repository or a remote repository.

8. The computer system of claim 7, wherein the plurality of repositories includes local repositories in the computer system and remote repositories outside of the computer system.

9. The computer system of claim 7, wherein a local repository has a higher priority than a remote repository, and wherein a computer bus card of the computer system has a higher priority than any other local repository in the computer system.

10. The computer system of claim 7, wherein copying the selected ROM code further comprises:
  determining whether the selected ROM code is located on a remote repository; and
  in response to determining that the selected ROM code is located on a remote repository, downloading the selected ROM code from the remote repository to yield a downloaded selected ROM code.

11. The computer system of claim 10, wherein copying the selected ROM code further comprises receiving input from a user to store the downloaded selected ROM code in a local repository in the computer system.

12. The computer system of claim 7, wherein the method further comprises:
  prior to the accessing, determining that existing ROM code in a computer bus card in the computer system is not present or invalid; and
  performing the accessing and the selecting in response to determining that existing ROM code in a computer bus card in the computer system is not present or invalid.

13. A non-transitory computer-readable storage medium including instructions that, when executed by at least one processor of a server system, cause the server system to perform operations comprising:
  accessing one or more copies of a ROM code in at least one of the plurality of repositories, wherein the ROM code is configured to execute an initialization process for the specific device;
  selecting one of the one or more copies of the ROM code based on a selection criterion to yield a selected ROM code;
  copying the selected ROM code to the system memory of the computer system, wherein the one of the one or more copies of the ROM code is a copy of updated expansion ROM code; and
  executing the selected ROM code in the system memory to initialize the specific device,
  wherein the selection criterion further comprises:
  determining whether a most recent copy of the ROM code is identified from the one or more copies of the ROM code;
  in response to determining that a most recent copy of the ROM code is identified, selecting the most recent copy as the selected ROM code; and
  in response to determining that a most recent copy of the ROM code is not identified, selecting a copy of the ROM code with a highest priority as the selected ROM code, wherein the priority is associated with a location of the copy of the ROM code; the location being either a local repository or a remote repository.

14. The non-transitory computer-readable storage medium of claim 13, wherein the plurality of repositories includes local repositories in the computer system and remote repositories outside of the computer system.

15. The non-transitory computer-readable storage medium of claim 14, wherein a local repository has a higher priority than a remote repository, and wherein a computer bus card of the computer system has a higher priority than any other local repository in the computer system.

16. The non-transitory computer-readable storage medium of claim 13, wherein copying the selected ROM code further comprises:
  determining whether the selected ROM code is located on a remote repository; and
  in response to determining that the selected ROM code is located on a remote repository, downloading the selected ROM code from the remote repository to yield a downloaded selected ROM code.

17. The non-transitory computer-readable storage medium of claim 16, wherein copying the selected ROM code further comprises receiving input from a user to store the downloaded selected ROM code in a local repository in the computer system.

18. The non-transitory computer-readable storage medium of claim 13, wherein the method further comprises:
  prior to the accessing, determining that existing ROM code in a computer bus card in the computer system is not present or invalid; and
  performing the accessing and the selecting in response to determining that existing ROM code in a computer bus card in the computer system is not present or invalid.

* * * * *